Patented Jan. 4, 1938

2,104,539

UNITED STATES PATENT OFFICE 2,104,539

MOTOR CAR

Walter Häcker, Sindelfingen, near Stuttgart, Germany, assignor to Daimler-Benz Aktiengesellschaft, Stuttgart-Unterturkheim, Germany Application July 8, 1936, Serial No. 89,506
In Germany November 5, 1934

11 Claims. (Cl. 40—130)

This invention relates to improvements in motor cars and, more particularly, to the illumination of the license plates or other identifying means therefor.

An object of this invention is the provision of economical and novel means for illuminating the license plates of vehicles.

A further object of this invention is the mounting and illuminating of the license plates for vehicles in such a manner that said plates and illuminating means fit into the contour of the vehicle, thereby leaving its normal airflow undisturbed.

Another object of this invention is the proper illumination of vehicle identifying means to comply with all legal requirements, and at the same time avoiding all glare when viewed from the side.

Still another object of this invention is the provision of improved means for simultaneously illuminating the license plates of the vehicle and the interior thereof.

And a still further object of this invention is the provision of improved lighting means for a vehicle for simultaneously illuminating the license plates thereof and forming warning signals therefor.

Further objects and advantages of the invention will appear from the following detailed description of the constructional form, shown by way of example, on the accompanying drawing in which:

Fig. 1 is a side view of and a partial vertical section through the rear portion of a motor car, and Fig. 2 is a plan view of the rear half of Fig. 1.

As illustrated in the accompanying drawing which shows a preferred form of the invention, a transverse depression $a$ is formed integrally with the body structure $b$ in the sloping rear portion of a vehicle. This body portion $b$ is so curved as to offer the lowest possible resistance to the air flowing over and behind the vehicle when in motion. This depression $a$, as is best seen in Fig. 1, is formed integrally with the body structure and preferably during the manufacture of such body. The depressed portion $a$ is adapted to receive vehicle identifying means in accordance with various statutory regulations. Such means may be either identifying numerals and letters directly applied to said depressed body portion or, on the other hand, separate license plates may be attached thereto by any suitable means.

Above the license plate $a$ and within the car body is a casing $f$ containing one or more lamps $e$. This casing is formed at its outer surface by a suitable pressed portion of the wall $b$ and at its inner side by a suitable pressed sheet metal member $g$. The casing $f$ may, if desired, be subdivided by transverse walls $h$ into a plurality of compartments, each of which contains one of the lamps $e$. The outer portion of the casing $f$ projects over the upper edge or rim of the obliquely positioned license plate, as shown in the drawing, and in the projecting portion of the bottom of every compartment is an aperture through which the light emitted by the lamp $e$ situated in its respective compartment can illuminate the license plate. By reason of the fact that the license plate or other vehicle identifying means is placed in or other vehicle identifying means is placed in this depressed portion of the body, the light from the various lamps $e$ will fall directly upon and illuminate such license plates without any side glare.

Extending upwardly and rearwardly from the various compartments are outwardly directed apertures which may be closed, for example, by colored glass, transparent Celluloid, or any equivalent material, through which the light emitted by the lamps can penetrate so as to be visible from the rear of the vehicle. The mountings for said apertures are preferably formed by approximately annular depressions of the rims thereof, that is, of the respective portions of material of the car body. As illustrated merely by way of example, the two outer lamps may be continually switched on during darkness in order to act as tail lamps, at the same time illuminating the license plate in the improved manner above described. The middle lamp can be utilized solely as a stop lamp when the brake is actuated.

In addition to the above described apertures, there are further apertures $o$ formed in the casing $f$ and opening within the rear body portion of the vehicle. If, as illustrated in the drawing, the features of this invention are applied to a vehicle in which a motor $l$ is positioned in the rear end of the body $m$, the illumination emitted from the lamps $e$ and penetrating through the apertures $o$ are exceedingly useful in lighting up the engine in case of any necessary repairs or adjustment thereto. I wish it to be understood, however, that my invention is not limited to the combination with a rear engined motor vehicle but the light extending into the rear portion of the vehicle body may readily serve to illuminate any compartment formed in the rear portion of the vehicle. If desired, a flap $n$ may be positioned above the motor by means of which access may be had to the rear body chamber.

verse depression in said body portion adapted to receive vehicle identifying means, and means above said depressed portion for illuminating said depressed portion and said vehicle identifying means, said illuminating means being so positioned within said body that its outer portion lies approximately flush with the contour of said rear body portion and includes a casing attached to said body portion and lying approximately flush with said body portion, said casing having light openings extending downwardly and rearwardly, and at least one lamp within said casing.

WALTER HÄCKER.

Jan. 4, 1938.    J. C. HOFFMAN    2,104,540
CLOSURE FOR CONTAINERS
Filed Jan. 9, 1935
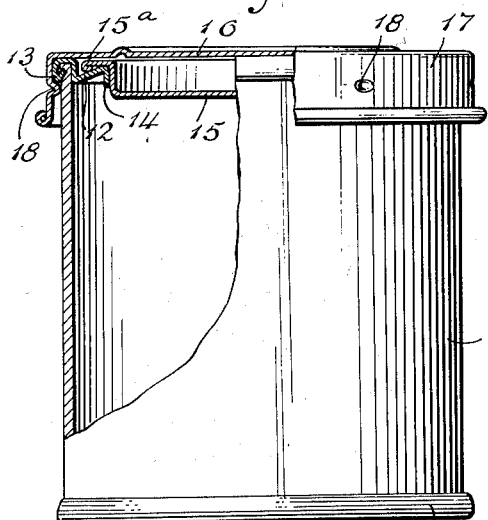
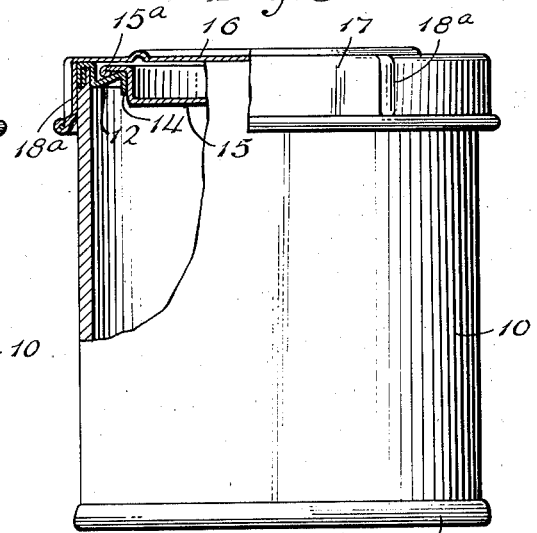
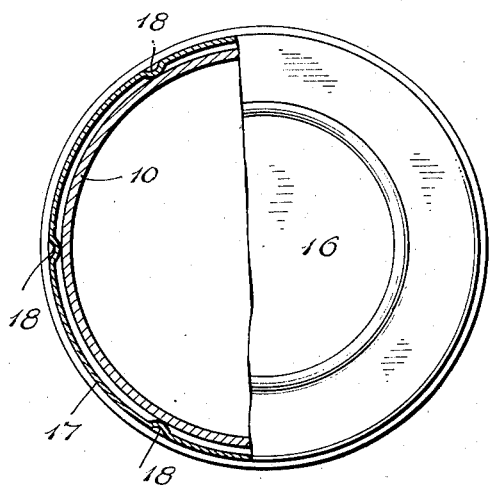
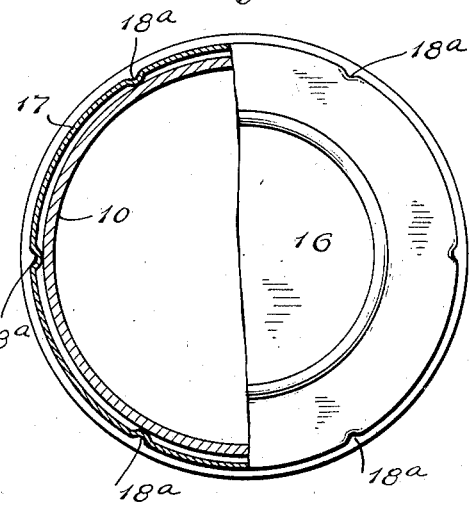
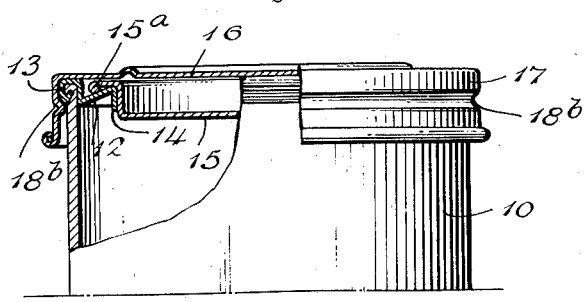
INVENTOR.
JOSEPH C. HOFFMAN
BY
ATTORNEYS